(12) United States Patent
Liu et al.

(10) Patent No.: US 12,535,862 B2
(45) Date of Patent: Jan. 27, 2026

(54) SUPPORT ASSEMBLY, DISPLAY MODULES AND DISPLAY DEVICES

(71) Applicant: BOE Technology Group Co., Ltd., Beijing (CN)

(72) Inventors: Junhuan Liu, Beijing (CN); Hong Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 199 days.

(21) Appl. No.: 18/580,454

(22) PCT Filed: May 4, 2023

(86) PCT No.: PCT/CN2023/092104
§ 371 (c)(1),
(2) Date: Jan. 18, 2024

(87) PCT Pub. No.: WO2024/227297
PCT Pub. Date: Nov. 7, 2024

(65) Prior Publication Data
US 2025/0085748 A1  Mar. 13, 2025

(51) Int. Cl.
*G06F 1/16* (2006.01)
(52) U.S. Cl.
CPC .......... *G06F 1/1656* (2013.01); *G06F 1/1652* (2013.01)

(58) Field of Classification Search
CPC ......... G06F 1/1656; G06F 1/1652; G09F 9/30
See application file for complete search history.

(56) References Cited

U.S. PATENT DOCUMENTS

| | | | | |
|---|---|---|---|---|
| 11,579,658 | B2 * | 2/2023 | Kim | G06F 1/1681 |
| 11,849,551 | B2 * | 12/2023 | Choi | G06F 1/1652 |
| 2019/0034143 | A1 * | 1/2019 | Wu | G06F 3/14 |
| 2023/0152855 | A1 * | 5/2023 | Liu | G06F 1/1675 |
| | | | | 361/679.01 |

FOREIGN PATENT DOCUMENTS

CN  115289346 A  * 11/2022 ............. G09F 9/301

* cited by examiner

*Primary Examiner* — Sagar Shrestha
(74) *Attorney, Agent, or Firm* — WHDA, LLP

(57) ABSTRACT

A supporting assembly, a displaying module and a displaying device are provided by the present disclosure. The supporting assembly includes: a plurality of supporting strips that are disposed separately, wherein one of two neighboring supporting strips includes a first side wall, the other of the two neighboring supporting strips includes a second side wall, the first side wall and the second side wall face and are separate from each other, and a gap between the first side wall and the second side wall includes an unlocking region and a locking region; and one side of each of the plurality of supporting strips is configured to be connected to a flexible display panel; and a locking block movably disposed between the first side wall and the second side wall. The supporting assembly has a low requirement on the machining precision.

20 Claims, 9 Drawing Sheets

SUPPORT ASSEMBLY, DISPLAY MODULES AND DISPLAY DEVICES

TECHNICAL FIELD

The present disclosure relates to the technical field of displaying and, more particularly, to a supporting assembly, a displaying module and a displaying device.

BACKGROUND

Scroll displaying devices provided with a flexible display panel are convenient to use. In usage, the flexible display panel stretches out from the housing. When the usage ends, the flexible display panel is curled inside the housing.

SUMMARY

A supporting assembly, a displaying module and a displaying device are provided by the embodiments of the present disclosure.

In an aspect, a supporting assembly is provided, wherein the supporting assembly includes:

a plurality of supporting strips that are disposed separately, wherein one of two neighboring supporting strips includes a first side wall, the other of the two neighboring supporting strips includes a second side wall, the first side wall and the second side wall face and are separate from each other, and a gap between the first side wall and the second side wall includes an unlocking region and a locking region; and one side of each of the plurality of supporting strips is configured to be connected to a flexible display panel; and a locking block movably disposed between the first side wall and the second side wall, wherein when the locking block is located within the unlocking region, the flexible display panel located between the two neighboring supporting strips is bendable, and when the locking block moves to the locking region, the locking block contacts the first side wall and the second side wall at a same time.

In some embodiments, when the locking block is located within the locking region, the locking block is interference-fitted to the first side wall and the second side wall.

In some embodiments, a minimum distance between the first side wall and the second side wall within the locking region is less than a minimum distance between the first side wall and the second side wall within the unlocking region.

In some embodiments, the unlocking region and the locking region are arranged in an extending direction of the supporting strips.

In some embodiments, the first side wall includes a first guiding surface located within the unlocking region, and in a direction from the unlocking region pointing to the locking region, the first guiding surface is gradually close to the second side wall; and/or the second side wall includes a second guiding surface located within the unlocking region, and in the direction from the unlocking region pointing to the locking region, the second guiding surface is gradually close to the first side wall; and when the locking block moves between the unlocking region and the locking region, the first guiding surface and/or the second guiding surface are configured to guide the locking block.

In some embodiments, the locking block includes a circular-arc surface, and when the locking block is located within the unlocking region, the circular-arc surface contacts the first guiding surface and/or the second guiding surface.

In some embodiments, the supporting strips is provided with a first limiting portion, the locking block is provided with a second limiting portion, and when the locking block is located within the locking region, the first limiting portion and the second limiting portion cooperate to stop the locking block from disengaging from the locking region.

In some embodiments, the first limiting portion is a slot, and the second limiting portion is a protrusion; or the first limiting portion is a protrusion, and the second limiting portion is a slot; and when the locking block is located within the locking region, the protrusion is stuck in the slot.

In some embodiments, the supporting assembly further includes an elastic piece, the elastic piece is connected to the locking block, and when the locking block is located within the locking region, the elastic piece has elastic deformation, and generates an elastic force from the locking region pointing to the unlocking region.

In some embodiments, the elastic piece, the locking block and the supporting strips are manufactured through an integral molding process.

In some embodiments, when the locking block is located within the unlocking region, the locking block does not contact the first side wall and/or the second side wall.

In some embodiments, a plurality of locking blocks are disposed between the first side wall and the second side wall, and the plurality of locking blocks are arranged separately in an extending direction of the supporting strips.

In another aspect, a displaying module is provided, wherein the displaying module includes a flexible display panel and the supporting assembly, and the supporting assembly is connected to one side of the flexible display panel.

In yet another aspect, a displaying device is provided, wherein the displaying device includes an accommodation component and the displaying module, the displaying module includes a first end and a second end facing each other in a direction perpendicular to the supporting strips, and the first end is connected to the accommodation component; and the accommodation component includes a guiding piece, and when the second end of the displaying module moves in a direction away from the accommodation component, the locking blocks passing through the guiding piece move from the unlocking regions to the locking regions under driving of the guiding piece.

In some embodiments, when the second end of the displaying module moves toward the accommodation component, the locking blocks passing through the guiding piece move from the locking regions to the unlocking regions under the driving of the guiding piece.

In some embodiments, a guiding track is disposed in the guiding piece, the locking blocks passing through the guiding piece are acting locking blocks, and at least part of each of the acting locking blocks is located inside the guiding track, and is movable along the guiding track; and the guiding track extends in the direction perpendicular to the supporting strips, the guiding track includes a first region close to the accommodation component and a second region away from the accommodation component, and in the direction perpendicular to the supporting strips, the first region faces the unlocking regions, and the second region faces the locking regions.

In some embodiments, the displaying module includes a third end and a fourth end facing each other in a direction parallel to the supporting strips, the displaying module further includes a plurality of sliding shafts, the plurality of sliding shafts are arranged separately in the direction perpendicular to the supporting strips, the sliding shafts are located at the third end and/or the fourth end of the displaying module, the accommodation component includes a spiral track, and at least part of each of the sliding shafts is embedded inside the spiral track, and is movable along the spiral track.

In some embodiments, the accommodation component further includes a driving arm, one end of the driving arm cooperates with at least one of the sliding shafts, and the other end of the driving arm is rotatably connected to a center of the spiral track.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly described below. Apparently, the figures that are described below are embodiments of the present disclosure, and a person skilled in the art can obtain other figures according to these figures without paying creative work.

REFERENCE NUMBERS

100—displaying module;
110—flexible display panel;
110a—first area;
110b—second area;
110c—third area;
120—supporting strips;
120a—first limiting portion;
121—first side wall;
122—second side wall;
123—first guiding face;
124—second guiding face;
125—slot;
130—locking block;
130a—second limiting portion;
140—elastic piece;
150—sliding shafts;
200—accommodation component;
210—driving arm;
211—long strip hole;
220—guiding piece;
221—first sub-piece;
222—second sub-piece;
223—guiding track;
223a—first region;
223b—second region;
223c—transition region;
230—housing; and
240—spiral track.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
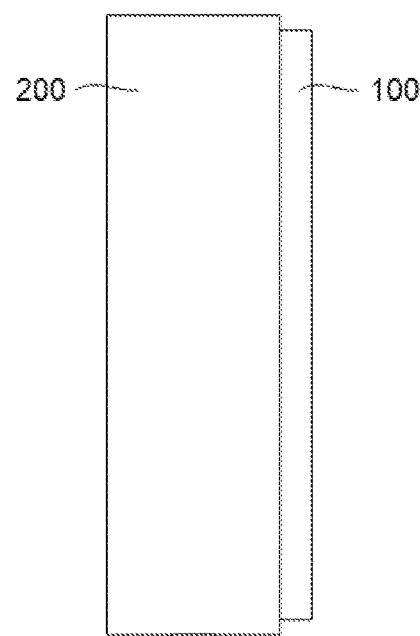
FIG. 1 schematically shows a displaying device in a first state.
Figure 2:
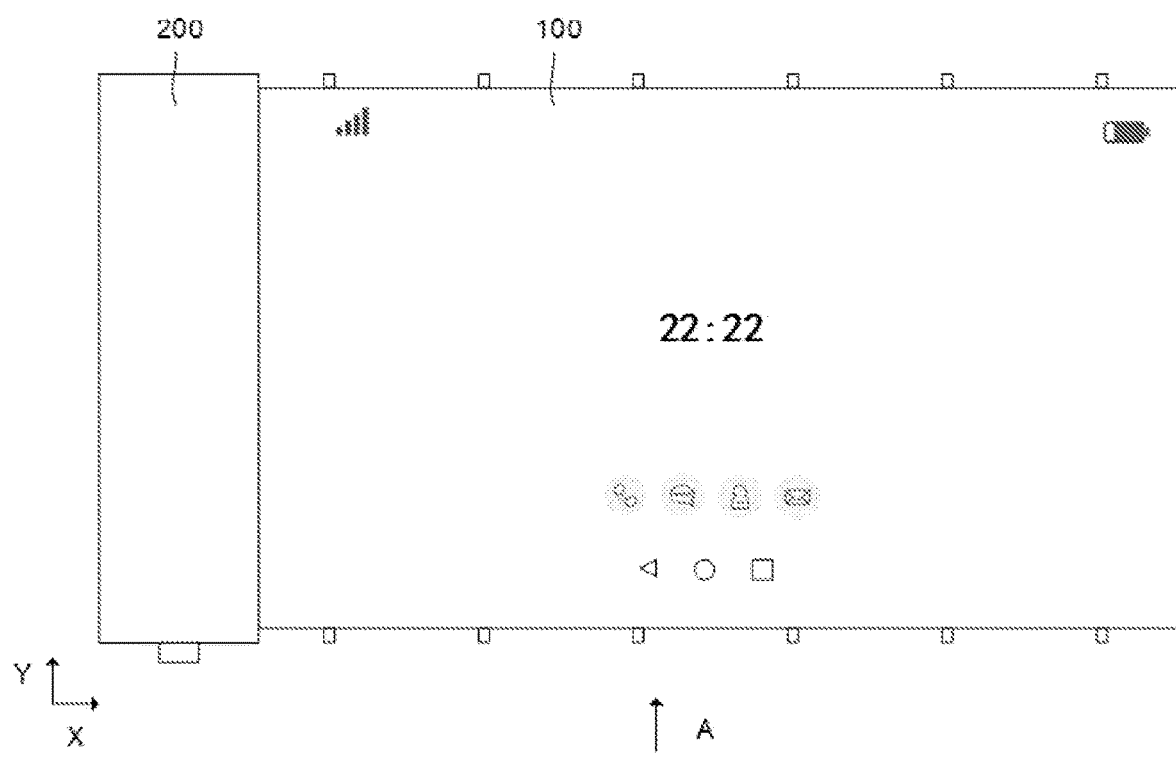
FIG. 2 schematically shows a displaying device in a second state.

FIG. 1 schematically shows a displaying device in a first state. FIG. 2 schematically shows a displaying device in a second state. As shown in FIG. 1 and FIG. 2, a displaying device is provided by some embodiments of the present disclosure. The displaying device may be but is not limited to a mobile phone, a personal digital assistant (PDA), a hand-held or portable computer, a GPS receiver/navigator, a camera, an MP4 video player, a video camera, a game machine, a computer, a computer monitor, a vehicle display (for example, an odometer display), a navigator, a cockpit controller and/or display, a camera view display (for example, the display of a rear view camera of a vehicle), an electronic photograph, and an electronic billboard or signboard. FIG. 1 and FIG. 2 is illustrated by taking the case as an example in which the displaying device is a mobile phone.

Referring continuously to FIG. 1 and FIG. 2, the displaying device includes an accommodation component 200 and a displaying module 100. The displaying device has at least a first state and a second state. When the displaying device is in the first state, the whole or most of the area of the displaying module 100 is accommodated inside the accommodation component 200, as shown in FIG. 1. When the displaying device is in the second state, the whole or most of the area of the displaying module 100 stretches out of the accommodation component 200 and is deployed, as shown in FIG. 2. The deployment as used herein is a description when it is compared with the first state in which it is accommodated inside the accommodation component 200, and does not mean that the displaying module 100 is located in an ideal plane. In practical applications, the displaying module 100 may also have a small-angle curve in the second state.

As an example, as shown in FIG. 2, in the first direction X, the displaying module 100 includes a first end and a second end that are opposite, and the first end of the displaying module 100 is connected to the accommodation component 200. When the first end of the displaying module 100 rotates inside the accommodation component 200 about a rotation shaft parallel to a second direction Y, the whole or most of the area of the displaying module 100 can be curled inside the accommodation component 200, so that the displaying device enters the first state. When the second end of the displaying module 100 is pulled to move in the direction away from the accommodation component 200, the displaying module 100 is uncurled out of the accommodation component 200, and is deployed outside the accommodation component 200, so that the displaying device enters the second state. The curling and the uncurling of the displaying module 100 may be completed by the user manually, and may also be completed by the driving of the accommodation component 200, which is not limited in the embodiments of the present application.

The accommodation component 200 is used to connect and accommodate the displaying module 100.

Figure 20:
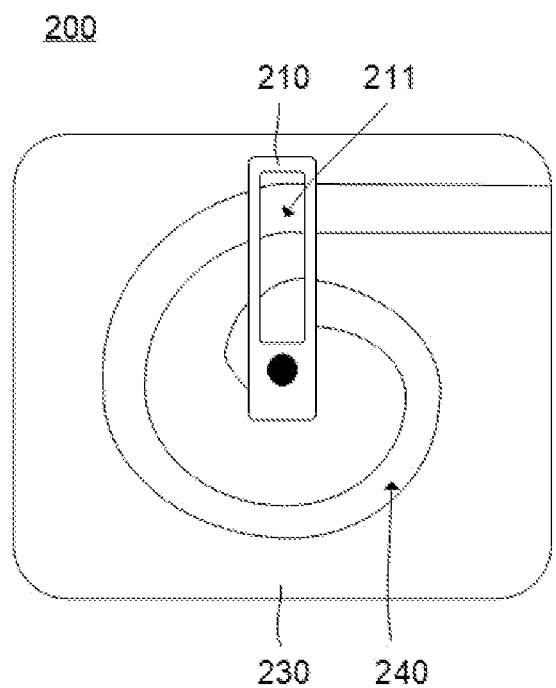
FIG. 20 schematically shows a structural diagram of an accommodation component.

As an example, as shown in FIG. 20, the accommodation component 200 includes a housing 230, and an accommodating cavity is provided in the housing 230. When the displaying device is in the first state, the whole or most of the area of the displaying module 100 is accommodated inside the accommodating cavity, thus the displaying module 100 is not susceptible to external collision under the protection by the housing 230, and the room occupation of the displaying device is reduced.

In practical applications, a battery and a controlling board that are electrically connected to the displaying module 100 may also be disposed inside the housing 230. The battery is used to supply electric energy for the displaying module 100. The controlling board is used to control the displaying module 100 to display images. A central processing unit, a memory, a mainboard, an antenna and so on are provided in the housing 230, which is not limited in the embodiments of the present disclosure.

The displaying module 100 includes a flexible display panel 110. The flexible display panel 110 is bendable. The flexible display panel 110 may be an electroluminescent display panel or a photoluminescent display panel. If the flexible display panel 110 is an electroluminescent display panel, the electroluminescent display panel may be an organic electroluminescent (Organic Light Emitting Diode, referred to for short as OLED) display panel or a quantum-dot electroluminescent (Quantum-Dot Light Emitting Diode, referred to for short as QLED) display panel. If the flexible display panel 110 is a photoluminescent display panel, the photoluminescent displaying device may be a quantum-dot photoluminescent display panel.

In some embodiments of the present disclosure, the case is taken as an example for the description in which the flexible display panel 110 is an organic light emitting diode (referred to for short as OLED) display panel.

When the displaying device is in the second state, in order to cause the flexible display panel 110 located outside the accommodation component 200 to be in the deployment state, the displaying module 100 further includes a supporting assembly. The supporting assembly is connected to one side of the flexible display panel 110, to support the flexible display panel 110, to prevent bending of the flexible display panel 110.

As an example, the flexible display panel 110 includes a light exiting side and a shadow side opposite to the light exiting side, and the supporting assembly is connected to the shadow side of the flexible display panel 110.

Figure 3:
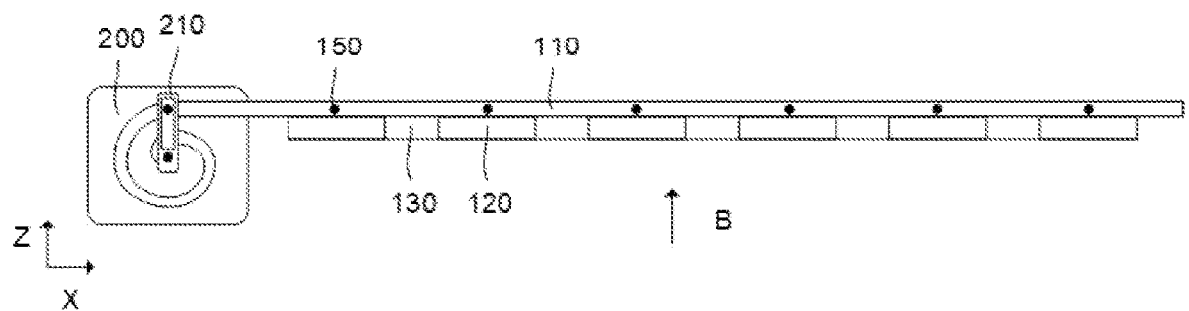
FIG. 3 is a view in the direction A in FIG. 2.
Figure 4:
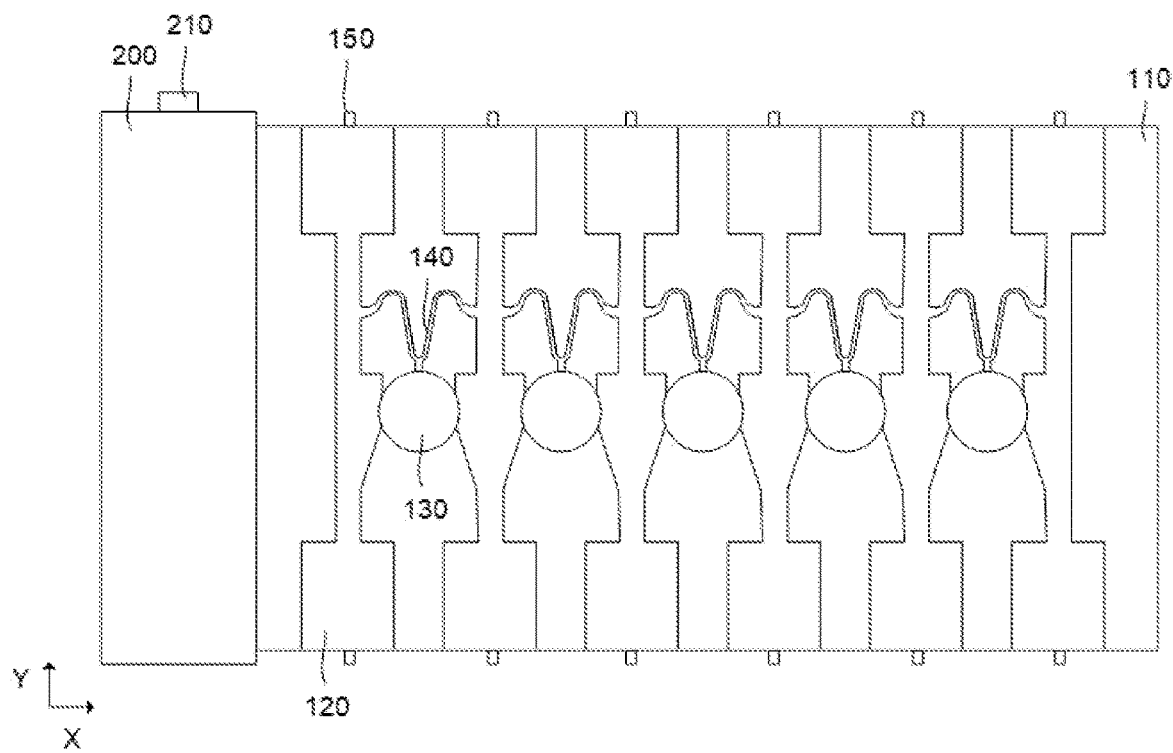
FIG. 4 is a view in the direction B in FIG. 3.

FIG. 3 is a view in the direction A in FIG. 2. FIG. 4 is a view in the direction B in FIG. 3. As shown in FIG. 3 and FIG. 4, the supporting assembly includes a plurality of supporting strips 120 and locking blocks 130.

The dimension of each of the supporting strips 120 in the first direction X is the width, the dimension in the second direction Y is the length, and the dimension in the third direction Z is the thickness. The supporting strip 120 may be long strip; in other words, the dimension in the length direction of the supporting strip 120 is much greater than the dimension in the width direction. The supporting strip 120 may also be of a thin-plate shape at the same time; in other words, the dimension in the thickness direction of the supporting strip 120 is much less than the dimension in the width direction, to reduce the thickness of the supporting assembly, thereby the overall thickness of the displaying module 100 is reduced, and the accommodation of the displaying module 100 inside the accommodation component 200 is facilitated.

The supporting strips 120 are connected to one side of the flexible display panel 110. As an example, the supporting strips 120 are connected to one side of the flexible display panel 110 by adhesive bonding. Certainly, the supporting strips 120 may also be connected to one side of the flexible display panel 110 by ultrasonic welding. The supporting strips 120 may also be of an integral structure with a substrate of the flexible display panel 110. The mode of the connection between the supporting strips 120 and the flexible display panel 110 is not limited in the embodiments of the present disclosure.

The supporting strips 120 may be made by using a material that has a high strength and is not easily deformable, for example, a metal, a carbon fiber and a glass fiber material.

The plurality of supporting strips 120 are separate from each other, so that a gap is formed between two neighboring supporting strips 120, and the flexible display panel 110 in the gaps is not supported by supporting strips 120. When the displaying device is in the first state, the flexible display panel 110 in the gaps is bendable, so that at least part of the area of the displaying module 100 is accommodated inside the accommodation component 200 by the mode of curling.

As an example, as shown in FIG. 3 and FIG. 4, the plurality of supporting strips 120 are arranged separately in the first direction X, and the minimum distances between two neighboring supporting strips 120 are equal. The first direction X may be the direction in which the displaying module 100 stretches out of the accommodation component 200 or retracted into the accommodation component 200.

Figure 5:
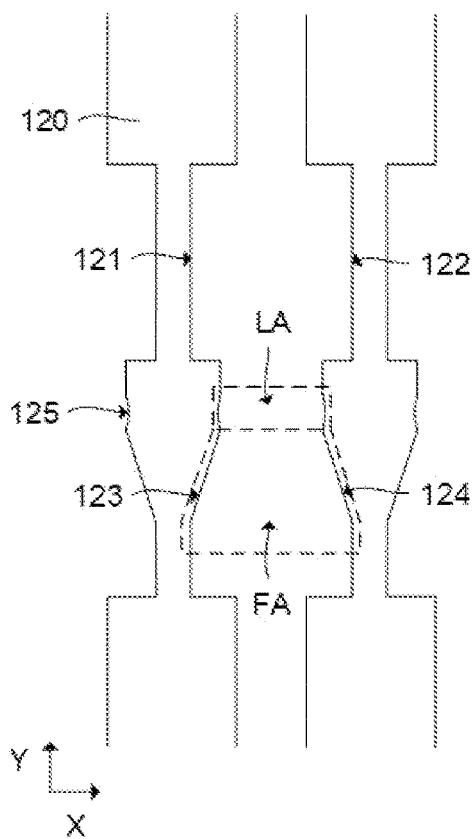
FIG. 5 schematically shows a diagram of a part of structure of two neighboring supporting strips.

FIG. 5 schematically shows a diagram of a part of a structure of two neighboring supporting strips. As shown in FIG. 5, one of the two neighboring supporting strips 120 includes a first side wall 121, the other of the two neighboring supporting strips includes a second side wall 122, and the first side wall 121 and the second side wall 122 face and are separate from each other. Accordingly, a gap is formed between the first side wall 121 and the second side wall 122.

As an example, one supporting strip 120 includes both of the first side wall 121 and the second side wall 122 at a same time. For example, both of the supporting strip 120 on the left and the supporting strip 120 on the right in FIG. 5 include two side walls in the first direction X, wherein the side walls facing the right side are the first side walls 121, and the side walls facing the left side are the second side walls 122. Among the two neighboring supporting strips 120, there is a gap formed between the first side wall 121 of one of the supporting strips 120 and the second side wall 122 of the other supporting strip 120.

The gap between the first side wall 121 and the second side wall 122 includes an unlocking region FA and a locking region LA. The gap between the first side wall 121 and the second side wall 122 refers to the region of the orthographic projection of the flexible display panel 110 that is located between the first side wall 121 and the second side wall 122. The unlocking region FA and the locking region LA may be delimited by a virtual line; in other words, they are not separated by a physical structure.

The locking block 130 is disposed between the first side wall 121 and the second side wall 122, and the locking block 130 is movable, thus the locking block 130 can move from the unlocking region FA to the locking region LA, and can also move from the locking region LA to the unlocking region FA.

The locking block 130 may be connected to one side of the flexible display panel 110, and may also be connected to the supporting strips 120.

As an example, a sliding rail is disposed at one side of the flexible display panel 110, the sliding rail is located between the first side wall 121 and the second side wall 122, and the locking block 130 is slidably connected to the sliding rail, thus the locking block 130 is movable along the sliding rail.

As an example, a chute extending in the length direction of the supporting strips 120 is disposed at the first side wall 121 and/or the second side wall 122, a sliding block is disposed on the locking block 130, the sliding block is embedded inside the chute, and the locking block 130 is slidable along the chute. Additionally, the cooperation between the sliding block and the chute can prevent falling of the locking block 130.

Figure 6:
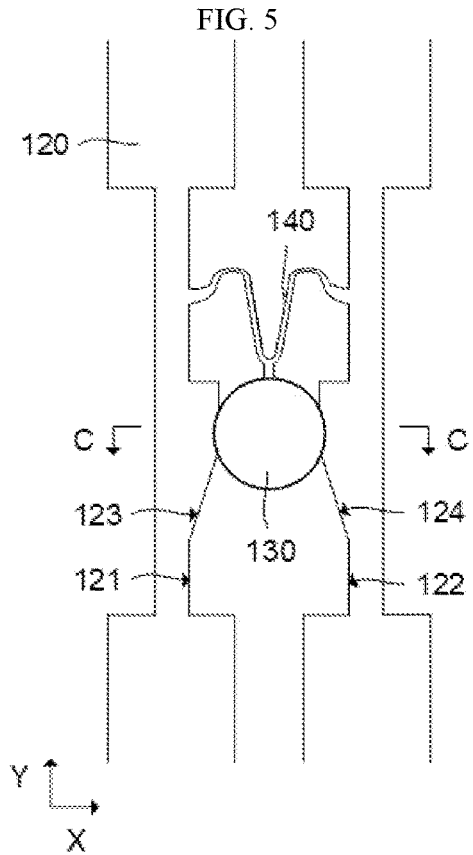
FIG. 6 schematically shows a structural diagram when the locking block is located within the locking region.
Figure 7:
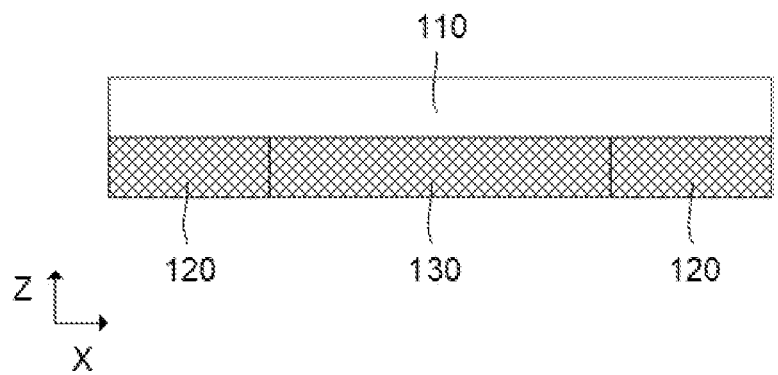
FIG. 7 is a sectional view along C-C in FIG. 6.
Figure 8:
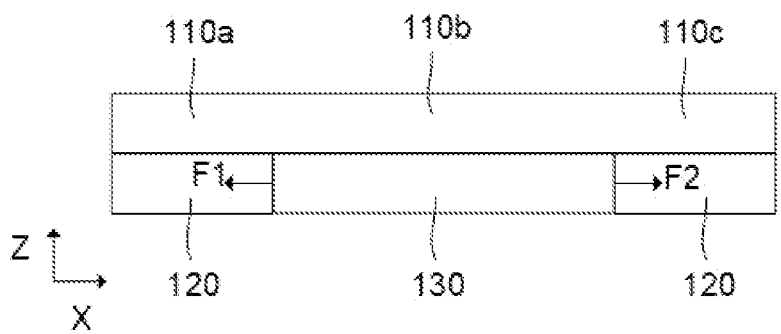
FIG. 8 is a diagram of force analysis of FIG. 7.

FIG. 6 schematically shows a structural diagram when the locking block is located within the locking region. FIG. 7 is a sectional view along C-C in FIG. 6. FIG. 8 is a diagram of force analysis of FIG. 7. As shown in FIG. 6 and FIG. 7, when the locking block 130 is located within the locking region LA, the part of the gap between the first side wall 121 and the second side wall 122 that is located within the locking region LA is filled with the locking block 130, thus one side in the first direction X of the locking block 130 contacts the first side wall 121, and the other side in the first direction X of the locking block 130 contacts the second side wall 122; in other words, the locking block 130 contacts the first side wall 121 and the second side wall 122 at a same time.

The locking block 130 may include a matching surface, and when the locking block 130 is located within the locking region LA, the matching surface of the locking block 130 contacts the first side wall 121 and the second side wall 122.

As shown in FIG. 8, when the two neighboring supporting strips 120 have the trend of bending in the directions shown by the circular-arc arrows, the locking block 130 located between the two neighboring supporting strips 120 stops the bending paths of the two supporting strips 120, so that the two supporting strips 120 cannot be bent in the directions shown by the circular-arc arrows, thus the flexible display panel 110 maintains the deployment state by the cooperation between the supporting strips 120 and the locking block 130.

Referring continuously to FIG. 8, the flexible display panel 110 includes an area 110a of a first region 223a connected to the supporting strip 120 on the left, a third area 110c connected to the supporting strip 120 on the right, and an area 110b of a second region 223b corresponding to the locking block 130. When the area 110a of the first region 223a and the third area 110c of the flexible display panel 110 have a trend of bending movement relative to the area 110b of the second region 223b in the directions shown by the circular-arc arrows, the area 110a of the first region 223a drives the supporting strip 120 on the left to squeeze the locking block 130, the third area 110c drives the supporting strip 120 on the right to squeeze the locking block 130, and both of the supporting strip 120 on the left and the supporting strip 120 on the right cannot continue moving under the stopping of the locking block 130. Accordingly, the area 110a of the first region 223a and the third area 110c cannot be bent with respect to the area 110b of the second region 223b, so that the displaying module 100 maintains the deployment state. Particularly, the locking block 130 applies a counter acting force F1 to the supporting strip 120 on the left, and applies a counter acting force F2 to the supporting strip 120 on the right, thus the supporting strip 120 on the left cannot continue moving under the effect of the counter acting force F1, and the supporting strip 120 on the right cannot continue moving by the effect of the counter acting force F2.

The locking block 130 may be made by using a material having a good rigid (for example, a metal and a rigid plastic), to prevent deformation of the locking block 130 under the squeezing of the supporting strips 120.

When the locking block 130 is located within the locking region LA, that may mean that the whole structure of the locking block 130 is located within the locking region LA, and may also mean that a part of the structure of the locking block 130 is located within the locking region LA. As an example, that the locking block 130 is located within the locking region LA refers to that the matching surface of the locking block 130 is located within the locking region LA.

As an example, when the displaying device is in the second state, the region of the displaying module 100 that is located outside the accommodation component 200 is the working region. The locking block 130 disposed within the working region is located within the locking region LA at this moment, and the locking block 130 located within the locking region LA cooperates with the supporting strips 120, to cause the flexible display panel 110 located within the working region to maintain the deployment state.

When the locking block 130 is located within the unlocking region FA, the flexible display panel 110 located between the two neighboring supporting strips 120 is bendable, so that the displaying module 100 can be bent within the region between the two neighboring supporting strips 120, thus the displaying module 100 can be accommodated inside the accommodation component 200 by a mode of curling.

As an example, when the displaying device is in the first state or the second state, the region of the displaying module 100 that is located inside the accommodation component 200 is the non-working region. The locking block 130 disposed within the non-working region is located within the unlocking region FA at this moment, so that the two neighboring supporting strips 120 disposed within the non-working region can be bent, thus the displaying module 100 is accommodated inside the accommodation component 200 by the mode of curling.

Figure 9:
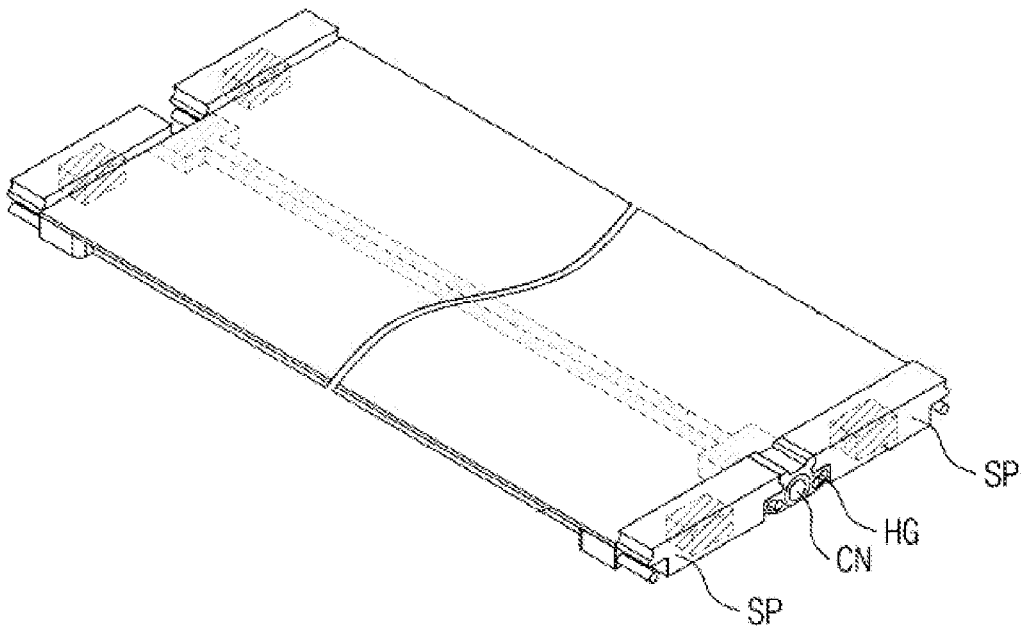
FIG. 9 and FIG. 10 are a solution of the supporting of a displaying device in the related art.
Figure 10:
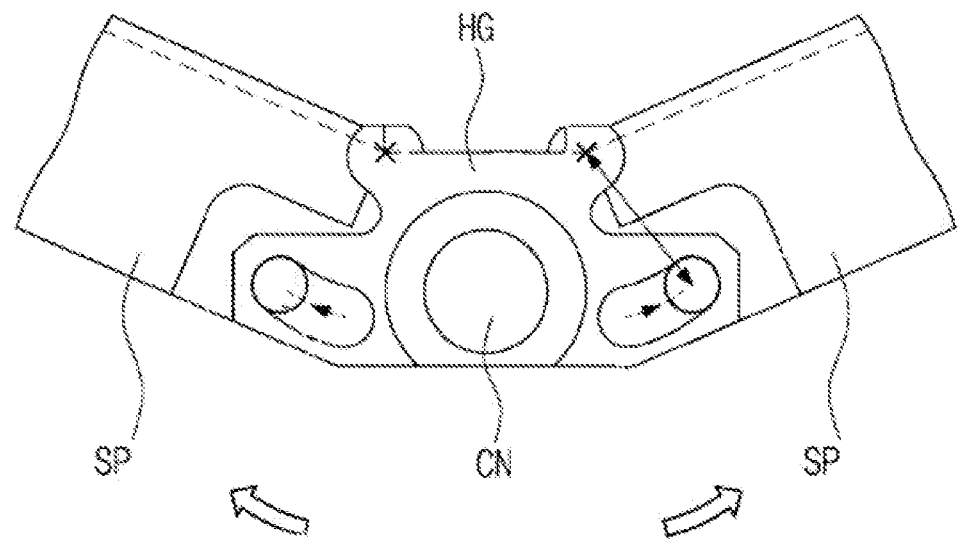

FIG. 9 and FIG. 10 are solutions of the supporting of a displaying device in the related art. In the figures, HG is a hinge, CN is a rotation shaft, and SP is structural members. Two neighboring structural members are connected by the hinge, chutes are disposed inside the hinge, and the structural members are provided with sliding shafts. In the curling state, dislocation-amount absorptions of different radii are realized by using the sliding positions of the sliding shafts inside the chutes. In the deployment state, the supporting to the display panel is realized by the cooperation between the sliding shafts and the chutes. However, in such a solution, the machining errors and the assembly errors of the hinge and the structural members directly affect the effects of the curling and deployment of the displaying device.

As compared with the solution in the related art, in the embodiments of the present disclosure, the plurality of supporting strips 120 that are disposed separately are disposed at one side of the flexible display panel 110, and the locking block 130 is disposed between two neighboring supporting strips 120. When the locking block 130 is located within the locking region LA, the locking block 130 contacts the two neighboring supporting strips 120 at the same time, so that the locking block 130 stops the relative movement between the two neighboring supporting strips 120, thus the flexible display panel 110 connected to the supporting strips 120 cannot be easily bent, thereby the supporting to the flexible display panel 110 is realized. Because it is merely required that the locking block 130 contacts two supporting strips 120 at the same time within the locking region LA to realize the supporting to the flexible display panel 110, the requirement on the machining precision of the supporting strips 120 and the locking block 130 is reduced.

Both of the two neighboring supporting strips 120 are connected to one side of the flexible display panel 110, the minimum distance in the first direction X between the two neighboring supporting strips 120 within the locking region LA is a, and the dimension in the first direction X of the locking block 130 may be slightly greater than a. When the locking block 130 moves to the locking region LA, the locking block 130 squeezes the two neighboring supporting strips 120, so that both of the two neighboring supporting strips 120 move in the directions away from the locking block 130, thereby the flexible display panel 110 located between the two neighboring supporting strips 120 stretches, to cause the flexible display panel 110 to generate an elastic force. The elastic force acts on the two neighboring supporting strips 120, so that the two neighboring supporting strips 120 clamp the locking block 130 located between the two neighboring supporting strips 120. In an aspect, it makes that the locking block 130 does not easily fall from the position between the two neighboring supporting strips 120. In another aspect, the flexible display panel 110 stretches slightly, so that the flexible display panel 110 has a better effect of deployment. In yet another aspect, because the locking block 130 and the two neighboring supporting strips 120 may be interference-fitted, a machining error or assembly error of the locking block 130 and the supporting strips 120 can be tolerated.

The minimum distance between the first side wall 121 and the second side wall 122 within the locking region LA is less than the minimum distance between the first side wall 121 and the second side wall 122 within the unlocking region FA. Within the locking region LA, the locking block 130 contacts the first side wall 121 and the second side wall 122 at the same time; in other words, the dimension of the locking block 130 in the direction perpendicular to the supporting strips 120 is approximately equal to the minimum distance between the first side wall 121 and the second side wall 122. When the minimum distance between the first side wall 121 and the second side wall 122 within the unlocking region FA is greater than the minimum distance between the first side wall 121 and the second side wall 122 within the locking region LA, the locking block 130 does not contact the first side wall 121 and/or the second side wall 122, so that the flexible display panel 110 located between the first side wall 121 and the second side wall 122 is bendable, thus the displaying module 100 can be curled inside the accommodation component 200.

Figure 11:
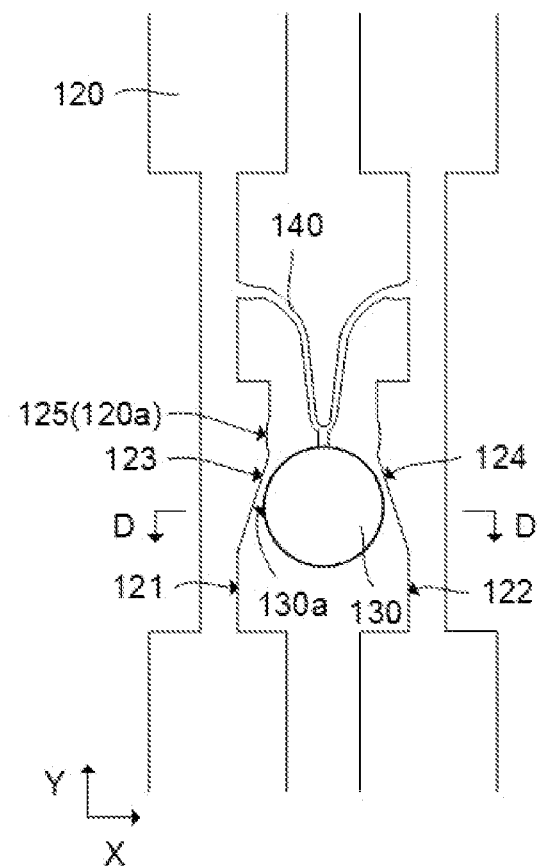
FIG. 11 schematically shows a structural diagram when the locking block is located within the unlocking region.

FIG. 11 schematically shows a structural diagram when the locking block is located within the unlocking region FA. As an example, when the locking block 130 is located within the unlocking region FA, the locking block 130 may not contact the first side wall 121 and the second side wall 122.

Figure 12:
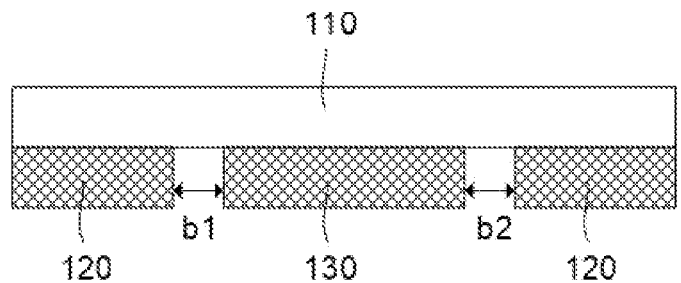
FIG. 12 is a sectional view along D-D in FIG. 11.

FIG. 12 is a sectional view along D-D in FIG. 11. As shown in FIG. 12, there is a first gap b1 formed between the locking block 130 and the first side wall 121, and there is a second gap b2 formed between the locking block 130 and the second side wall 122.

Figure 13:
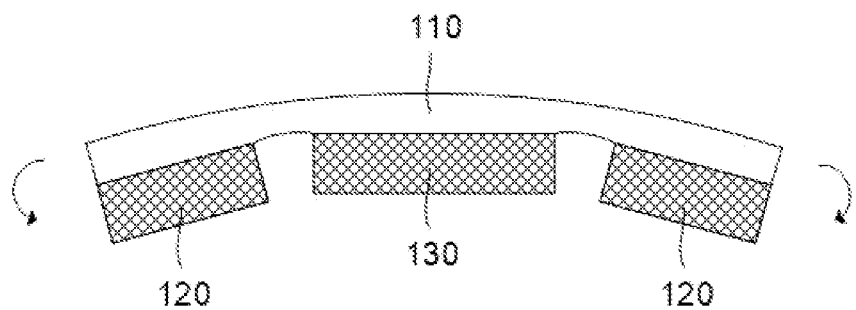
FIG. 13 is a schematic diagram of the bending state in FIG. 12.

FIG. 13 is a schematic diagram of the bending state in FIG. 12. As shown in FIG. 13, because there is the first gap b1 formed between the locking block 130 and the first side wall 121, and there is the second gap b2 formed between the locking block 130 and the second side wall 122, when the two ends of the structure shown in FIG. 13 have the trend of bending movement along the circular-arc arrows, the area of the flexible display panel 110 that corresponds to the first gap b1 and the area of the flexible display panel 110 that corresponds to the second gap b2 are bent.

Figure 14:
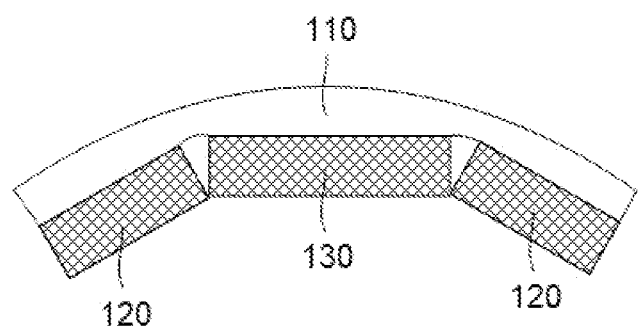
FIG. 14 is a schematic diagram after the structure shown in FIG. 13 is bent.

FIG. 14 is a schematic diagram after the structure shown in FIG. 13 is bent. As shown in FIG. 14, when the flexible display panel 110 continues being bent so that the locking block 130 contacts the first side wall 121 and the second side wall 122, the flexible display panel 110 stops being bent.

It can be known from FIGS. 11 to 14 that, when the locking block 130 is located within the unlocking region FA, the displaying module 100 is bendable, so that the displaying module 100 can be accommodated inside the accommodation component 200 by the mode of curling.

The unlocking region FA and the locking region LA may be arranged in the extending direction of the supporting strips 120. At this moment, the locking block 130 can move in the extending direction of the supporting strips 120 to realize the position switching of the locking block 130 between the unlocking region FA and the locking region LA.

Certainly, the unlocking region FA and the locking region LA may also be arranged in the direction perpendicular to the flexible display panel 110. For example, the locking block 130 is overall of a wedge shape, and when the tip part of the locking block 130 is inserted between the two neighboring supporting strips 120 in the direction perpendicular to the flexible display panel 110 and contacts the first side wall 121 and the second side wall 122, the locking block 130 is located within the locking region LA. When the locking block 130 moves in the direction away from the flexible display panel 110 so that the locking block 130 disengages from the first side wall 121 and the second side wall 122, the locking block 130 is located within the unlocking region FA. In addition, the unlocking region FA and the locking region LA may also be arranged in other directions, which are not listed in detail herein.

As compared with the case in which the unlocking region FA and the locking region LA are arranged in the direction perpendicular to the flexible display panel 110, when the unlocking region FA and the locking region LA are arranged in the extending direction of the supporting strips 120, the dimension of the displaying module 100 in the direction perpendicular to the flexible display panel 110 is lower.

A guiding surface may be disposed in the unlocking region FA. When the locking block 130 moves from the unlocking region FA to the locking region LA, or moving from the locking region LA to the unlocking region FA, the guiding surface guides for the locking block 130. Additionally, when the locking block 130 is interference-fitted to the first side wall 121 and the second side wall 122, the dimension of the locking block 130 in the direction perpendicular to the supporting strips 120 is slightly greater than the distance between the first side wall 121 and the second side wall 122 within the locking region LA. By disposing the guiding surface, the locking block 130 can smoothly enter the locking region LA along the guiding surface, thereby the locking block 130 is prevented from being stuck due to a large size.

The guiding surface may be disposed at the first side wall 121, may also be disposed at the second side wall 122, and may also be disposed at both of the first side wall 121 and the second side wall 122 at the same time.

As an example, the first side wall 121 includes a first guiding surface 123 located within the unlocking region FA, and in the direction from the unlocking region FA pointing to the locking region LA, the first guiding surface 123 is gradually close to the second side wall 122. In the direction from the unlocking region FA pointing to the locking region LA, the first guiding surface 123 is gradually close to the second side wall 122. In other words, the channel for the locking block 130 to move that is defined by the first guiding surface 123 and the second side wall 122 gradually narrows in the direction from the unlocking region FA pointing to the locking region LA. If the channel is narrower, the position of the locking block 130 is more accurate, thus the locking block 130 can smoothly enter the locking region LA.

As an example, the second side wall 122 includes a second guiding surface 124 located within the unlocking region FA, and in the direction from the unlocking region FA pointing to the locking region LA, the second guiding surface 124 is gradually close to the first side wall 121. In the direction from the unlocking region FA pointing to the locking region LA, the second guiding surface 123 is gradually close to the first side wall 121. In other words, the channel for the locking block 130 to move that is defined by the second guiding surface 124 and the first side wall 121 gradually narrows in the direction from the unlocking region FA pointing to the locking region LA. If the channel is narrower, the position of the locking block 130 is more accurate, thus the locking block 130 can smoothly enter the locking region LA.

As an example, the first side wall 121 includes the first guiding surface 123, and the second side wall 122 includes the second guiding surface 124. In the direction from the unlocking region FA pointing to the locking region LA, the first guiding surface 123 is gradually close to the second side wall 122, and the second guiding surface 123 is gradually close to the first side wall 121. In other words, the channel for the locking block 130 to move that is defined by the second guiding surface 124 and the first guiding surface 123 gradually narrows in the direction from the unlocking region FA pointing to the locking region LA. If the channel is narrower, the position of the locking block 130 is more accurate, whereby the locking block 130 can smoothly enter the locking region LA.

Moreover, when the guiding surface is disposed in the unlocking region FA, and the locking block 130 is located within the unlocking region FA, the locking block 130 may contact both of the first guiding surface 123 and the second guiding surface 124. When the flexible display panel 110 between the first side wall 121 and the second side wall 122 is being bent, the first side wall 121 and the second side wall 122 squeeze the locking block 130, so that the locking block 130, by the guiding of the first guiding surface 123 and the second guiding surface 124, moves in the direction away from the locking region LA, to prevent the locking block 130 from affecting the bending of the displaying module 100.

The locking block 130 may include a circular-arc surface, and when the locking block 130 is located within the unlocking region FA, the circular-arc surface contacts the first guiding surface 123 and/or the second guiding surface 124; in other words, the matching surface of the locking block 130 is a circular-arc surface. The contacting between the circular-arc surface and the first guiding surface 123 or the second guiding surface 124 is a line contact, which reduces the contact area between the locking block 130 and the first guiding surface 123 or the second guiding surface 124, thereby the friction between the locking block 130 and the first guiding surface 123 or the second guiding surface 124 is reduced.

As an example, as shown in FIGS. 6 and 11, the orthographic projection of the locking block 130 on the flexible display panel 110 may be overall of a circular shape.

The supporting strips 120 may be provided with a first limiting portion 120a, the locking block 130 may be provided with a second limiting portion 130a, and when the locking block 130 is located within the locking region LA, the first limiting portion 120a and the second limiting portion 130a cooperate, to stop the locking block 130 from being disengaged from the locking region LA. Accordingly, the supporting to the flexible display panel 110 by the supporting assembly is more reliable. That the first limiting portion 120a and the second limiting portion 130a cooperate and stop the locking block 130 from being disengaged from the locking region LA refers to that, in the case in which the locking block 130 is not subjected a force other than those from the supporting strips 120 and an elastic piece 140 (the structure described below), the locking block 130 is prevented from being disengaged from the locking region LA.

The first limiting portion 120a and the second limiting portion 130a may be a cooperation between a slot and a protrusion. When the locking block 130 is located within the locking region LA, the protrusion is stuck in the slot. As an example, as shown in FIG. 11, the first limiting portion 120a is a slot 125, and the second limiting portion 130a is a protrusion. As an example, the first limiting portion 120a is a protrusion, and the second limiting portion 130a is a slot 125.

As an example, as shown in FIG. 11, the slot 125 is a circular-arc slot 125, and the protrusion is also of a circular-arc shape (for example, when the locking block 130 protects the circular-arc surface, the region where the circular-arc surface is located is a protrusion). The cooperation between the circular-arc slot 125 and the circular-arc protrusion is reliable and convenient to process. In addition, when a force in the direction parallel to the supporting strips 120 is applied to the locking block 130, the circular-arc protrusion can be easily disengaged from the circular-arc slot 125, thereby the movement of the locking block 130 from the locking region LA to the unlocking region FA is realized.

Certainly, the first limiting portion and the second limiting portion may also be fitted in other manners, for example, by using a clip.

The supporting assembly may further include an elastic piece 140, the elastic piece 140 is connected to the locking block 130, and when the locking block 130 is located within the locking region LA, the elastic piece 140 has elastic deformation, and generates an elastic force from the locking region LA pointing to the unlocking region FA. When the locking block 130 moves from the locking region LA toward the unlocking region FA, the elastic force can play a role in assisting the movement of the locking block 130, so that the locking block 130 has a higher movement speed, thereby the reaction speed of the supporting assembly is increased.

The elastic piece 140 may be made by using an elastic material, for example, a rubber, a plastic and a metal. When the locking block 130 is located within the locking region LA, the elastic piece 140 may have tensile deformation, and may also have compressive deformation.

Because the locking block 130 is required to move between the locking region LA and the unlocking region FA, the elastic piece 140 is required to have a high deformation amount. In practical applications, the elastic piece 140 may be curved into a certain shape, to satisfy the requirement on the deformation amount by the curving or the stretching of the elastic piece 140.

As an example, as shown in FIG. 6, the elastic piece 140 includes a plurality of bending sections. When the locking block 130 is located within the locking region LA, the bending sections of the elastic piece 140 increase or the bending angle of the bending sections decreases, to cause the elastic piece 140 to generate an elastic force.

The elastic piece 140, the locking block 130 and the supporting strips 120 may be manufactured, respectively, and assembled to realize the connection or fitting among the elastic piece 140, the locking block 130 and the supporting strips 120. The elastic piece 140, the locking block 130 and the supporting strips 120 may also be manufactured through an integral molding process.

As an example, all of the materials of the elastic piece 140, the locking block 130 and the supporting strips 120 are a plastic. Injection molding may be used to cause the elastic piece 140, the locking block 130 and the supporting strips 120 to be manufactured through an integral molding process.

As an example, all of the materials of the elastic piece 140, the locking block 130 and the supporting strips 120 are a metal. The elastic piece 140, the locking block 130 and the supporting strips 120 may be etched in a thin metal sheet by an etching process.

Certainly, the elastic piece 140, the locking block 130 and the supporting strips 120 may also be manufactured through an integral molding process in other manners such as laser cutting. The integral-molding processes are not listed in detail herein.

When the elastic piece 140, the locking block 130 and the supporting strips 120 are manufactured through an integral molding process, the errors of the relative positions among the elastic piece 140, the locking block 130 and the supporting strips 120 are reduced. Additionally, because it is not required to assemble the elastic piece 140, the locking block 130 and the supporting strips 120 to each other, the difficulty in the assembling is reduced. When the displaying module 100 is fabricated, it is merely required to connect the supporting assembly to one side of the flexible display panel 110.

Figure 15:
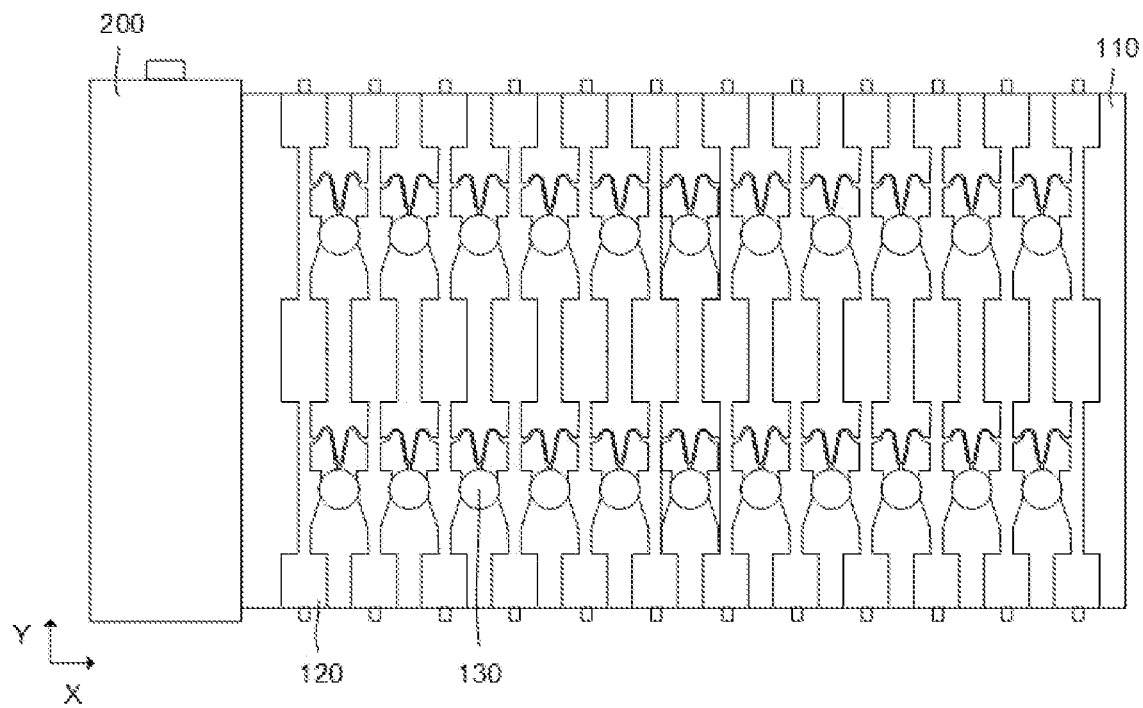
FIG. 15 schematically shows a structural diagram of a displaying device.

FIG. 15 schematically shows a structural diagram of a displaying device. As shown in FIG. 15, a plurality of locking blocks 130 are disposed between the first side wall 121 and the second side wall 122, and the plurality of locking blocks 130 are arranged separately in the extending direction of the supporting strips 120. When the displaying device is in the second state, when one of the locking blocks 130 is disengaged from the locking region LA, the other locking blocks 130 can still cooperate with the supporting strips 120 to continue supporting the flexible display panel 110, thereby the reliability of the supporting to the flexible display panel 110 by the supporting assembly is improved. Additionally, by disposing the plurality of locking blocks 130, the supporting strips 120 can be enabled to have a more even force bearing.

As an example, as shown in FIG. 15, two locking blocks 130 may be disposed between the two neighboring supporting strips 120. When the two locking blocks 130 are disposed between the two neighboring supporting strips 120, the directions of movement of the two locking blocks 130 may be the same, and may also be opposite.

For example, when the locking blocks 130 are moving from the unlocking regions FA toward the locking regions LA, the two locking blocks 130 may move in the same direction, may also move toward each other, and may also move in opposite directions.

Certainly, the quantity of the locking blocks 130 between the two neighboring supporting strips 120 may also be three, four, five and so on, and, in practical applications, may be set flexibly according to the size of the flexible display panel 110 and the size of the locking blocks 130.

The accommodation component 200 may include a guiding piece. When the displaying device switches between the first state and the second state, the guiding piece may drive the locking blocks 130 to move between the unlocking regions FA and the locking regions LA.

For example, when the displaying module 100 switches from the first state to the second state, at least part of the area of the displaying module 100 stretches out of the accommodation component 200 (in other words, the second end of the displaying module 100 moves in the direction away from the accommodation component 200). The region of the displaying module 100 that stretches out of the accommodation component 200 is the working region. While the working region is stretching out of the accommodation component 200, the locking blocks 130 located within the working region move from the unlocking regions FA to the locking regions LA under the driving of the guiding piece, to cause the working region of the displaying module 100 to be in the deployment state.

Figure 16:
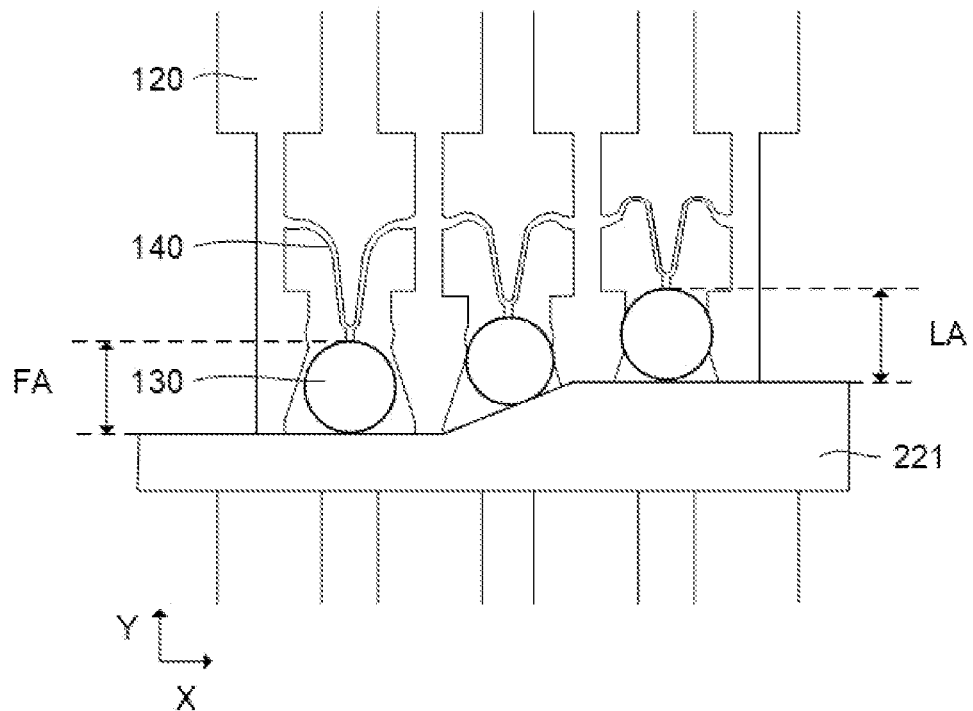
FIG. 16 schematically shows a diagram of a part of structure of a displaying device.

FIG. 16 schematically shows a partially structural diagram of a displaying device. As an example, as shown in FIG. 16, the guiding piece includes a first sub-piece 221, and the first sub-piece 221 is fixedly connected to the accommodation component 200. When the second end of the displaying module 100 moves in the direction away from the accommodation component 200 (the direction from left to right in the figure), the locking blocks 130 sequentially pass through the first sub-piece 221 in the direction from left to right, and the locking blocks 130 passing through the first sub-piece 221 move from the unlocking regions FA to the locking regions LA under the driving of the first sub-piece 221.

For example, when the displaying module 100 switches from the second state to the first state, at least part of the area of the displaying module 100 retracts from outside the accommodation component 200 and is curled into the accommodation component 200. The region of the displaying module 100 that is curled inside the accommodation component 200 is the non-working region. While the working region is retracting from outside the accommodation component 200 into the accommodation component 200 (in other words, while the working region of the displaying module 100 is transforming into the non-working region), the locking blocks 130 located within the working region move from the locking regions LA to the unlocking regions FA under the driving of the guiding piece, so that the working region of the displaying module 100 is converted from the deployment state into a bendable state, thus the displaying module 100 can be curled inside the accommodation component 200.

Figure 17:
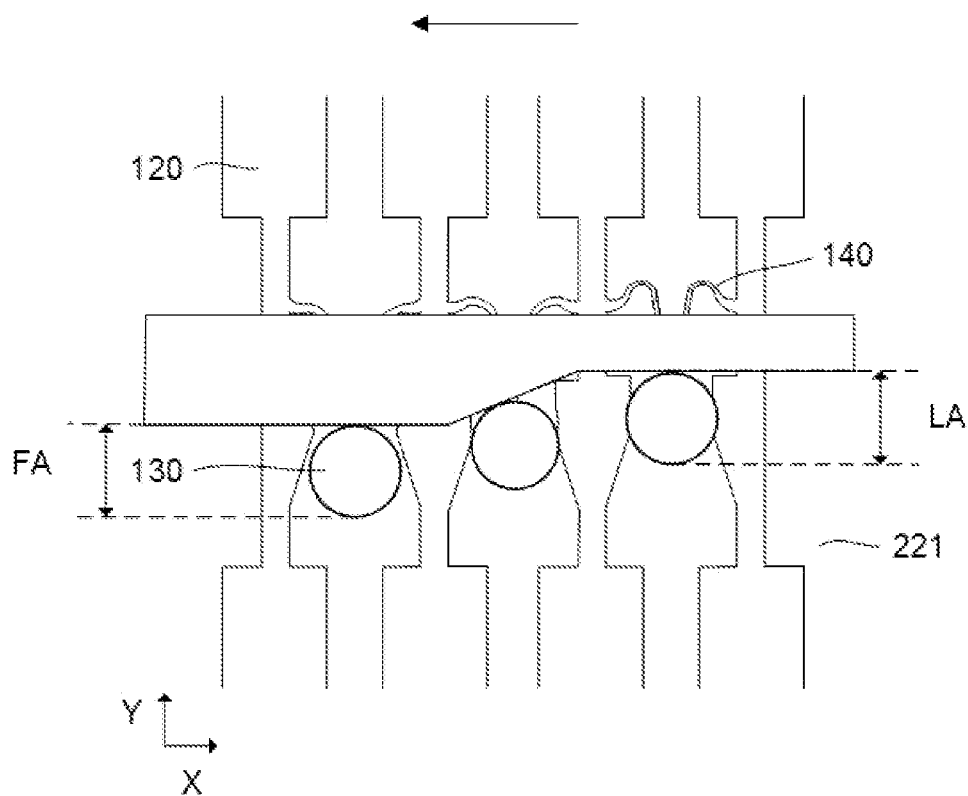
FIG. 17 schematically shows a diagram of a part of structure of another displaying device.

FIG. 17 schematically shows a diagram of a partial structure of another displaying device. As an example, as shown in FIG. 17, the guiding piece includes a second sub-piece 222, and the second sub-piece 222 is fixedly connected to the accommodation component 200. When the second end of the displaying module 100 moves toward the accommodation component 200 (the direction from right to left in the figure), the locking blocks 130 sequentially pass through the second sub-piece 222 in the direction from right to left, and the locking blocks 130 passing through the second sub-piece 222 move from the locking regions LA to the unlocking regions FA under the driving of the second sub-piece 222.

It should be noted that, in the process of the stretching-out or the retracting of the displaying module 100, the locking blocks 130 arranged in the direction perpendicular to the supporting strips 120 sequentially pass through the guiding piece, and move between the unlocking regions FA and the locking regions LA under the driving of the guiding piece. In other words, the locking blocks 130 passing through the guiding piece move between the unlocking regions FA and the locking regions LA, and the locking blocks 130 that have not passed through the guiding piece maintain the positions unchanged. Accordingly, the size of the working region of the displaying module 100 can be flexibly adjusted.

Figure 18:
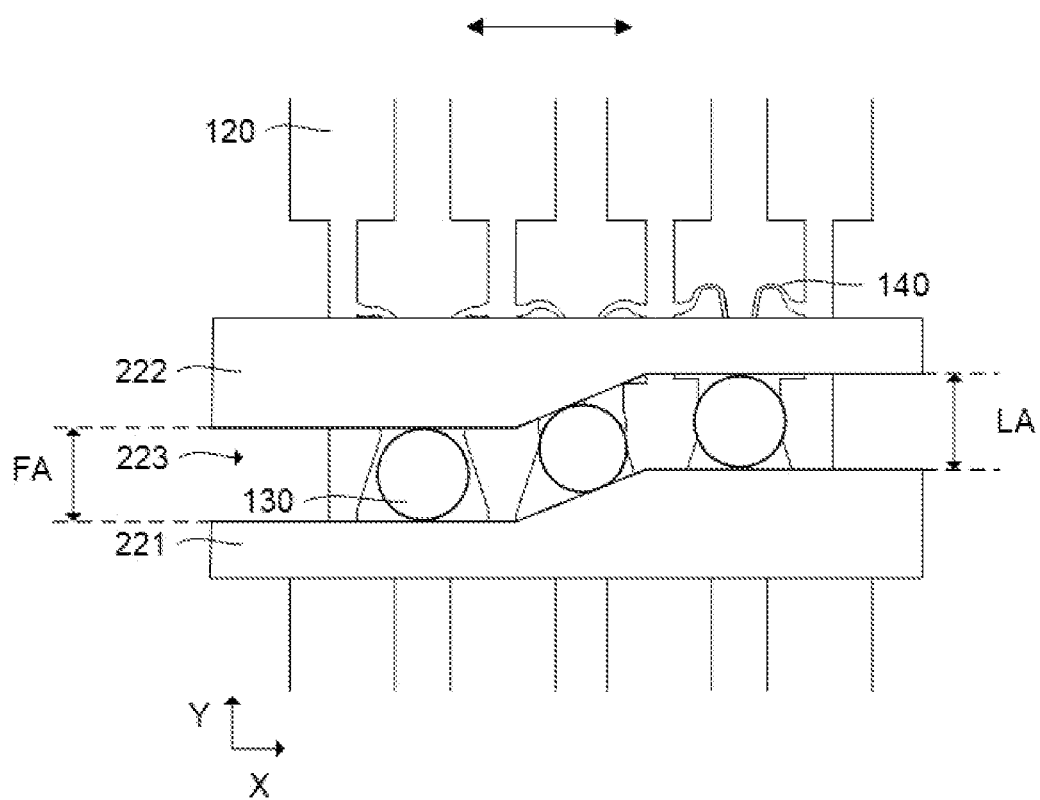
FIG. 18 schematically shows a structural diagram of yet another displaying device.
Figure 19:
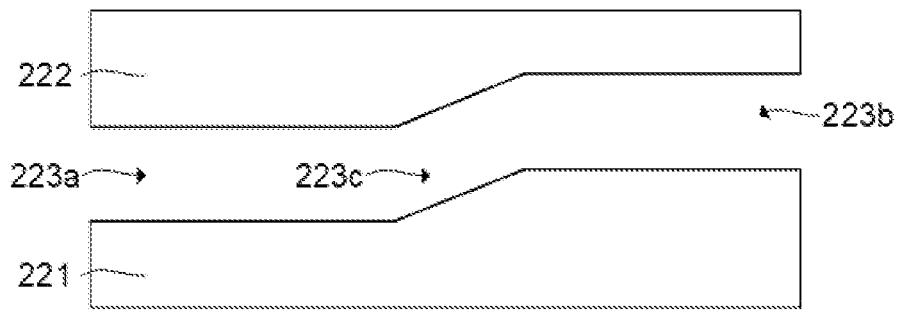
FIG. 19 schematically shows a structural diagram of a guiding piece.

FIG. 18 schematically shows a structural diagram of yet another displaying device. FIG. 19 schematically shows a structural diagram of a guiding piece. As an example, as shown in FIG. 18 and FIG. 19, the guiding piece includes both of a first sub-piece 221 and a second sub-piece 222 at the same time, and the first sub-piece 221 and the second sub-piece 222 face each other, to enclose a guiding track 223. The guiding track 223 extends in the direction perpendicular to the supporting strips 120, the guiding track 223 includes a first region 223a closer to the accommodation component 200 and a second region 223b further from the accommodation component 200, and in the direction perpendicular to the supporting strips 120, the first region 223a faces the unlocking regions FA, and the second region 223b faces the locking regions LA. The guiding track 223 further includes a transition region 223c connecting the first region 223a and the second region 223b.

The locking blocks 130 passing through the guiding piece are acting locking blocks 130. At least part of structure of each of the acting locking blocks 130 is located inside the guiding track 223, so that the acting locking blocks 130 move along the guiding track 223, and therefore the acting locking blocks 130 can switch between the locking regions LA and the unlocking regions FA.

As an example, the guiding piece is located at sides of the supporting strips 120 that are away from the flexible display panel 110, and a part of the structure of the locking blocks 130 stretches out of the sides of the supporting strips 120 that are away from the flexible display panel 110, thus the ends of the locking blocks 130 that are away from the flexible display panel 110 are located within the guiding track 223.

Referring continuously to FIG. 3 and FIG. 4, the displaying module 100 includes a third end and a fourth end that are opposite in the direction parallel to the supporting strips 120, the displaying module 100 may further include a plurality of sliding shafts 150, and the plurality of sliding shafts 150 are arranged separately in the direction perpendicular to the supporting strips 120. The sliding shafts 150 may be located at the third end of the displaying module 100, may also be located at the fourth end of the displaying module 100, and may also be located at both of the third end and the fourth end at the same time.

As an example, the sliding shafts 150 are connected to the supporting strips 120. For example, the sliding shafts 150 and the supporting strips 120 are of an integral structure, or the sliding shafts 150 are connected to the sides of the supporting strips 120 that are away from the flexible display panel 110.

FIG. 20 schematically shows a structural diagram of an accommodation component 200. As shown in FIG. 20, the accommodation component 200 includes a spiral track 240, and at least part of each of the sliding shafts 150 is embedded inside the spiral track 240, and is movable along the spiral track 240.

As an example, the sliding shafts 150 are disposed at both of the third end and the fourth end of the displaying module 100, and the spiral tracks 240 are disposed at both of the two ends of the accommodation component 200. The sliding shafts 150 slide along the spiral tracks 240, so that the displaying module 100 is curled inside the accommodation component 200 along the spiral tracks 240.

Referring continuously to FIG. 20, the accommodation component 200 may further include a driving arm 210, one end of the driving arm 210 cooperates with at least one of the sliding shafts 150, and the other end of the driving arm 210 is rotatably connected to the center of the spiral track 240. When the driving arm 210 is rotating along the center of the spiral track 240, one end of the driving arm 210 pulls the sliding shaft 150 to slide along the spiral track 240, so that the sliding shaft 150 pulls the displaying module 100 to move along the spiral track 240, to cause the displaying module 100 to be curled inside the accommodation component 200.

As an example, a long strip hole 211 is disposed inside the driving arm 210, the end of the sliding shaft 150 is located inside the long strip hole 211, and while the sliding shaft 150 is sliding along the spiral track 240, the sliding shaft 150 moves along the long strip hole 211 inside the driving arm 210.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "include" does not exclude elements or steps that are not listed in the claims. The word "a" or "an" preceding an element does not exclude the existing of a plurality of such elements. The present disclosure may be implemented by means of hardware including several different elements and by means of a properly programmed computer. In unit claims that list several devices, some of those devices may be embodied by the same item of hardware. The words first, second, third and so on do not denote any order. Those words may be interpreted as names.

Finally, it should be noted that the above embodiments are merely intended to explain the technical solutions of the present disclosure, and not to limit them. Although the present disclosure is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A supporting assembly, wherein the supporting assembly comprises:
   a plurality of supporting strips that are disposed separately, wherein one of two neighboring supporting strips comprises a first side wall, the other of the two neighboring supporting strips comprises a second side wall, the first side wall and the second side wall face and are separate from each other, and a gap between the first side wall and the second side wall comprises an unlocking region and a locking region; and one side of each of the plurality of supporting strips is configured to be connected to a flexible display panel; and
   a locking block movably disposed between the first side wall and the second side wall, wherein when the locking block is located within the unlocking region, the flexible display panel located between the two neighboring supporting strips is bendable, and when the locking block moves to the locking region, the locking block contacts the first side wall and the second side wall at a same time.

2. The supporting assembly according to claim 1, wherein when the locking block is located within the locking region, the locking block is interference-fitted to the first side wall and the second side wall.

3. The supporting assembly according to claim 2, wherein a minimum distance between the first side wall and the second side wall within the locking region is less than a minimum distance between the first side wall and the second side wall within the unlocking region.

4. The supporting assembly according to claim 2, wherein the supporting strips is provided with a first limiting portion, the locking block is provided with a second limiting portion, and when the locking block is located within the locking region, the first limiting portion and the second limiting portion cooperate to stop the locking block from disengaging from the locking region.

5. The supporting assembly according to claim 1, wherein a minimum distance between the first side wall and the second side wall within the locking region is less than a minimum distance between the first side wall and the second side wall within the unlocking region.

6. The supporting assembly according to claim 5, wherein the unlocking region and the locking region are arranged in an extending direction of the supporting strips.

7. The supporting assembly according to claim 6, wherein the first side wall comprises a first guiding surface located within the unlocking region, and in a direction from the unlocking region pointing to the locking region, the first guiding surface is gradually close to the second side wall; and/or the second side wall comprises a second guiding surface located within the unlocking region, and in the direction from the unlocking region pointing to the locking region, the second guiding surface is gradually close to the first side wall; and
   when the locking block moves between the unlocking region and the locking region, the first guiding surface and/or the second guiding surface are configured to guide the locking block.

8. The supporting assembly according to claim 7, wherein the locking block comprises a circular-arc surface, and when the locking block is located within the unlocking region, the circular-arc surface contacts the first guiding surface and/or the second guiding surface.

9. The supporting assembly according to claim 1, wherein the supporting strips is provided with a first limiting portion, the locking block is provided with a second limiting portion, and when the locking block is located within the locking region, the first limiting portion and the second limiting portion cooperate to stop the locking block from disengaging from the locking region.

10. The supporting assembly according to claim 9, wherein the first limiting portion is a slot, and the second limiting portion is a protrusion; or the first limiting portion is a protrusion, and the second limiting portion is a slot; and
    when the locking block is located within the locking region, the protrusion is stuck in the slot.

11. The supporting assembly according to claim 9, wherein the supporting assembly further comprises an elastic piece, the elastic piece is connected to the locking block, and when the locking block is located within the locking region, the elastic piece has elastic deformation, and generates an elastic force from the locking region pointing to the unlocking region.

12. The supporting assembly according to claim 11, wherein the elastic piece, the locking block and the supporting strips are manufactured through an integral molding process.

13. The supporting assembly according to claim 1, wherein when the locking block is located within the unlocking region, the locking block does not contact the first side wall and/or the second side wall.

14. The supporting assembly according to claim 1, wherein a plurality of locking blocks are disposed between the first side wall and the second side wall, and the plurality of locking blocks are arranged separately in an extending direction of the supporting strips.

15. A displaying module, wherein the displaying module comprises a flexible display panel and the supporting assembly according to claim 1, and the supporting assembly is connected to one side of the flexible display panel.

16. A displaying device, wherein the displaying device comprises an accommodation component and the displaying module according to claim 15, the displaying module comprises a first end and a second end facing each other in a direction perpendicular to the supporting strips, and the first end is connected to the accommodation component; and the accommodation component comprises a guiding piece, and when the second end of the displaying module moves in a direction away from the accommodation component, the locking blocks passing through the guiding piece move from the unlocking regions to the locking regions under driving of the guiding piece.

17. The displaying device according to claim 16, wherein when the second end of the displaying module moves toward the accommodation component, the locking blocks passing through the guiding piece move from the locking regions to the unlocking regions under the driving of the guiding piece.

18. The displaying device according to claim 16, wherein a guiding track is disposed in the guiding piece, the locking blocks passing through the guiding piece are acting locking blocks, and at least part of each of the acting locking blocks is located inside the guiding track, and is movable along the guiding track; and the guiding track extends in the direction perpendicular to the supporting strips, the guiding track comprises a first region close to the accommodation component and a second region away from the accommodation component, and in the direction perpendicular to the supporting strips, the first region faces the unlocking regions, and the second region faces the locking regions.

19. The displaying device according to claim 16, wherein the displaying module comprises a third end and a fourth end facing each other in a direction parallel to the supporting strips, the displaying module further comprises a plurality of sliding shafts, the plurality of sliding shafts are arranged separately in the direction perpendicular to the supporting strips, the sliding shafts are located at the third end and/or the fourth end of the displaying module, the accommodation component comprises a spiral track, and at least part of each of the sliding shafts is embedded inside the spiral track, and is movable along the spiral track.

20. The displaying device according to claim 19, wherein the accommodation component further comprises a driving arm, one end of the driving arm cooperates with at least one of the sliding shafts, and the other end of the driving arm is rotatably connected to a center of the spiral track.

* * * * *